No. 829,585. PATENTED AUG. 28, 1906.
B. HOLT.
HAULING TRUCK.
APPLICATION FILED DEC. 26, 1905.
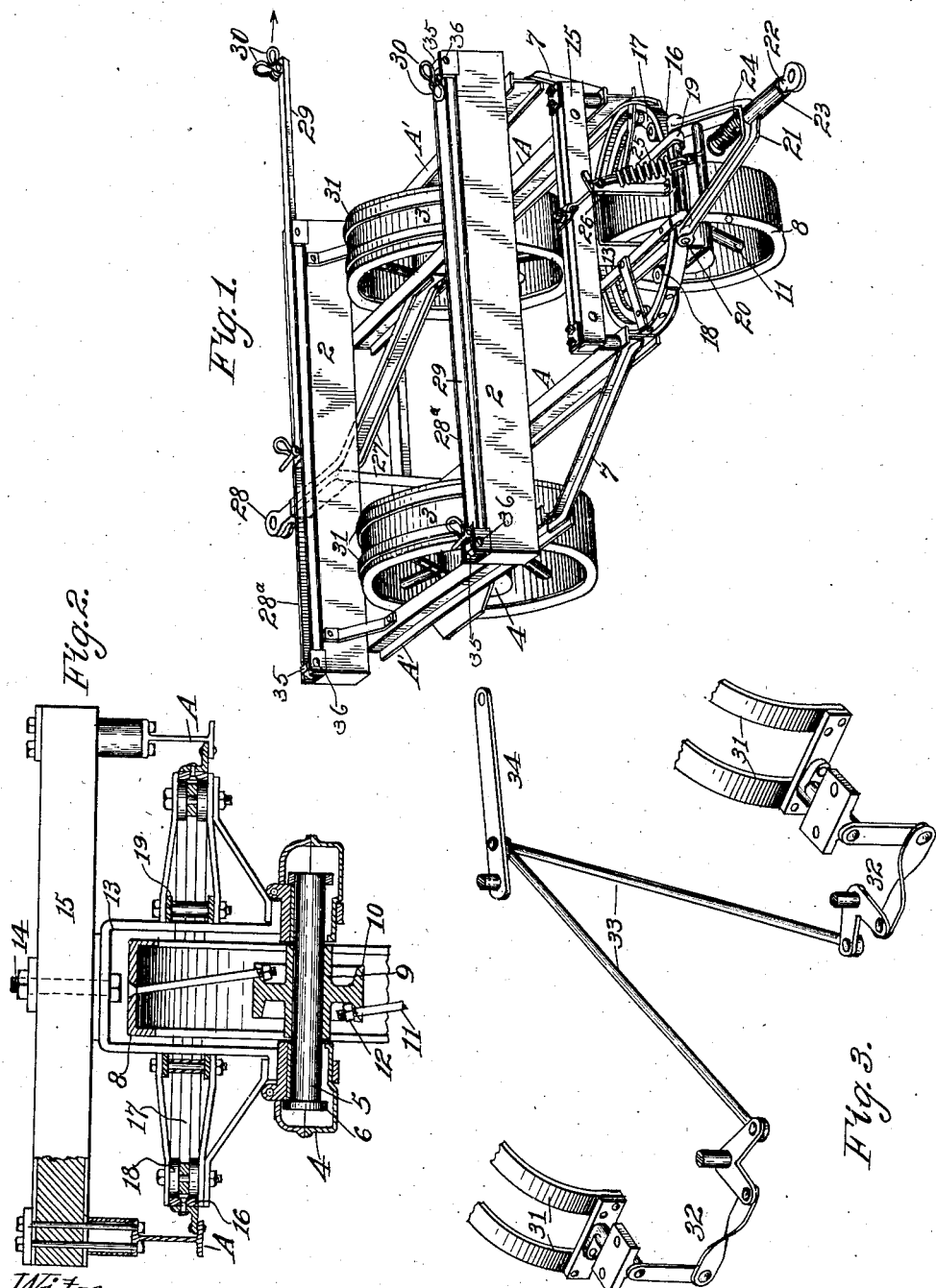
Witnesses:
Fred E. Maynard
J. F. Nurse
Inventor:
Benjamin Holt
By Geo. H. Strong Atty.

UNITED STATES PATENT OFFICE.

BENJAMIN HOLT, OF STOCKTON, CALIFORNIA.

HAULING-TRUCK.

No. 829,585.  Specification of Letters Patent.  Patented Aug. 28, 1906.

Application filed December 26, 1905. Serial No. 293,260.

*To all whom it may concern:*

Be it known that I, BENJAMIN HOLT, a citizen of the United States, residing at Stockton, in the county of San Joaquin and State of California, have invented new and useful Improvements in Hauling-Trucks, of which the following is a specification.

My invention relates to a truck which is especially designed for hauling heavy loads—such as lumber, ore in buckets, and the like—upon ordinary roads or surfaces.

It consists in a combination frame, wheels upon which said frame is mounted, and details of construction which will be more fully explained by reference to the accompanying drawings, in which—

Figure 1 is a perspective view of my improved truck. Fig. 2 is a vertical sectional view of the steering-wheel and frame, and Fig. 3 is a perspective view of the brake mechanism.

It is the object of my invention to provide a powerful truck adapted to convey very heavy loads over roads or rough irregular surfaces.

The frame is composed of main parallel I-beams A and exterior beams A'. Transversely across the beams A A' extend the heavy timbers 2, to which the beams are securely fastened. The space between the beams A A' serves to contain the main bearing-wheels 3. The shafts of these wheels extend across the spaces and are journaled to turn in boxes upon the beams A A', as shown at 4. These boxes may satisfactorily be of the same class and nature as railway-car axle-boxes. The axles 5 may have collars, as at 6, shrunk upon their outer ends and abutting against the ends of the journal-boxes. The I-beams A A' are here shown as having their rear ends substantially even transversely. The front ends of the beams A extend considerably forward of the beams A', and these front ends are united by diagonal beams 7, firmly bolted to the beams. Between the front ends of the beams A is the single bearing and steering-wheel 8. All of these wheels are here shown as made with broad metal rims. A hub 9, having flanges, as shown at 10, through which the spokes 11 of the wheel have their inner ends passed, and the outer ends having beveled heads, fit corresponding holes in the rims. By means of nuts, as at 12, turnable upon the screw-threaded inner ends of the spokes and within the flanges 10, tension may be brought upon these spokes. The spokes are inclined alternately from the flanges 10 upon each side of a center line, and thus give sufficient transverse rigidity to the wheel. The shaft of the front wheel is turnable in boxes, as at 4, all the journals being of the railway-car-axle pattern, as here shown.

13 is a yoke fitting over the wheel 8 and having a central king-bolt 14 passing up through the timber 15, which timber extends transversely above this wheel and is bolted through to the front ends of the beams A, which extend to a point opposite the center of the wheel. Between these beams is supported a ring 16 and within this ring is fitted the turnable ring or fifth-wheel 17, which carries the journal-boxes and frame of the front wheel 8. This ring 17 has a number of wheels or rollers, as at 18, turning on vertical axes, with their peripheries in contact with the ring 16, so that by suitable connections the front wheel may be turned to steer the vehicle, the ring 17 turning freely within the ring 16. Bars 19 extend across the ring 17 contiguous to and parallel with the sides of the wheel 8 and extending forwardly have eyes or journals through which passes a pivot-bolt 20. Upon this bolt is mounted the yoke 21, by which the means for hauling the car or truck may be made. In the present case I have shown a draw-bar 22 slidable through a sleeve 23, formed upon the front of the yoke or clevis 21, and at the rear end this draw-bar is surrounded by a spring, as at 24, of sufficient stiffness to allow a certain amount of elasticity in starting the load.

The yoke 21 may be held up and prevented from dropping by means of links with an elastic spring 25, which links are connected with a post 26, from which the yoke is normally suspended, so that its front end and the draw-bar are substantially in line to be connected with the motor or with the leading car where the cars are to be connected in train. The spring and the suspending links allow of such vertical motion of the yoke as may be necessary to conform to irregularities of the surface over which the connected cars may be passing.

In order to connect a series of these cars in a train which may be hauled by traction-engine or other power, I have shown the clevis or attachment at 28, which is bolted or otherwise secured between the rear ends of the brace-bars 27. These brace-bars diverge from the clevis, passing into the space between the beams A A' and having the front ends riveted thereto. Thus these bars 27 serve to make a rigid connection with the beams A and a strong draft apparatus for the connection of following cars. The draw-bars 22 of each following car are then connected with the clevis or draft device 28 of the car-head, and as these portions project from the rear of the cars there is sufficient room between them for any short turn that it may be desired to make.

Upon the transverse timbers 2 are fixed channel-irons 28$^a$, and these channel-irons serve as tracks within which the bars 29 are slidable either with or without antifrictional bearing rollers or surfaces. At the ends of these bars 29 are the loops or eyes 30. For the hauling of lumber it is piled upon the bars 29 and to any desired height and is then secured in place by chains passing over the lumber and securely fastened to the attachments 30 at each end of the transverse timbers and so secured that the load cannot shift while being transported.

Cars of this description may be coupled as described, so as to form trains of several cars, which are usually hauled by a traction-engine running over the ordinary surface of the ground, and by the peculiar arrangement of the connections the train is exceedingly flexible in its movements. It will be understood that cars thus constructed are capable of transporting any class of material or merchandise required.

In order to regulate the speed and to hold the cars on downgrades, I have shown brakes which consist of straps 31, passing over the peripheries of the wheels, having one end pivoted to the timbers or suitable support and the other end connected with a train of levers, as at 32, having connecting-rods 33 extending from each of the levers 32 to a hand-lever 34, by the operation of which the brakes for both wheels will be simultaneously operated.

To prevent the load from sliding off bodily when passing over uneven surfaces, I have shown stop-blocks 35, adapted to fit in the channel-guides 28$^a$ at the ends of the bars 29. These stops have holes made transversely through them to receive bolts 36, which also, passing through the channel-irons, hold the blocks in place. By withdrawing the bolts and removing the stops at the side toward which the load is to be discharged the bars 29, with their load, may be hauled off by attaching haul-ropes to the outer parts of the loops 30 and placing skids to receive the weight of the load when removed.

Having thus described my invention, what I claim, and desire to secure by Letters Patent, is—

1. A traction car or truck consisting of a pair of main bearing-wheels, a single front steering-wheel, a frame composed of parallel I-beams interior and exterior to the bearing-wheels said interior beams extending forwardly of the exterior beams, diagonally placed, connecting-braces extending between the front portions of the interior and exterior beams and a horizontally-turnable support for the front wheel, said support carrying boxes for the journals of the steering-wheel shaft.

2. In a traction car or truck, a frame consisting of interior and exterior parallel channel or I beams, said interior beams extending forwardly of the exterior beams, angular brace-bars by which the front ends of said beams are connected, main bearing-wheels independently journaled between the interior and exterior beams of the frame, a steering-wheel, a horizontally-turnable table to which the journals of the steering-wheel are connected, a draw-bar connected with the front of the steering-wheel frame, and a rear connection for the truck consisting of braces converging from the main beams to a point behind the frame.

3. In a traction car or truck, a frame composed of parallel channel or I beams, transverse timbers extending across and uniting the front and rear ends of said parallel beams, diagonal braces uniting the front ends of the exterior and the interior beams, convergent brace-bars bolted to the interior of the inner beams intermediate of their front and rear ends, and extending behind the rear end of the frame, said braces uniting and having a holding-clevis at their meeting-points, main wheels journaled between the outer and the inner beams of the main frame, a rim fixed between the front ends of the inner beams, a ring or carrier having wheels forming antifrictional bearings and traveling against the interior of the outer rim, a frame carried by said ring, a wheel journaled in said frame and turnable with the ring, a hauling-yoke connected with the turnable ring and a draw-bar extending forwardly from the yoke.

4. In a traction car or truck, the frame composed of parallel channel or I beams, transversely united and having diagonal braces at front and rear, main bearing-wheels journaled between the parallel I-beams, a steering-wheel, a frame in which it is journaled, a horizontally-turnable platform with which the wheel-frame is connected and turnable, a yoke extending forwardly from said turnable frame, a draw-bar slidable in the sleeve in the front end of the yoke and a spiral spring surrounding the draw-bar.

5. In a traction car or carriage, a frame composed of channel or I beams with transverse and diagonal connections, main bearing-wheels journaled between the beams of the frame, a steering-wheel connected and turnable with relation to the front end of the frame, a hauling-yoke extending forwardly from the steering-wheel frame, said yoke having a sleeve at its front end, a spring-pressed draw-bar slidable in said sleeve, and an elastic suspending device by which the yoke is supported.

6. In a traction car or truck, a frame composed of parallel channeled or I beams and transverse connecting-beams, main bearing-wheels journaled upon each side of said frame, a turnable steering-wheel journaled at the front thereof, a yoke and draw-bar extending from the front of the steering-wheel frame, braces having their separated ends bolted to the interior of the beams of the main frame converging rearwardly and beyond the rear of said frame and a clevis or connection at the junction of said braces whereby the draw-bar of each succeeding car may be connected with the car in front.

7. In a traction car or truck the combination of a main frame, bearing and steering wheels therefor, transversely-extending channel-bars, load-supporting bars slidable in the channeled bars, means on said bars for the attachment of load-holding chains, stops at the ends of the bars and fitting the channels thereof, and means detachably securing the stops to the channel-bars.

8. In a traction car or truck, a main frame, bearing and steering wheels therefor, transverse beams fixed to the main frame with channeled guides, load-supporting bars slidable in the channeled guides, swiveled loops upon the ends of the bars for the attachment of load-holding chains, and outhauling devices, and removable stops to hold the load-bars in place upon the guides.

In testimony whereof I have hereunto set my hand in presence of two subscribing witnesses.

BENJAMIN HOLT.

Witnesses:
   G. F. DICKENSON,
   GEO. H. COWIE.